(12) United States Patent
Choi

(10) Patent No.: US 9,331,736 B2
(45) Date of Patent: May 3, 2016

(54) METHOD AND APPARATUS FOR PROCESSING SIGNALS AT TIME DIVISION DUPLEX TRANSCEIVER

(75) Inventor: Pil-Soon Choi, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 647 days.

(21) Appl. No.: 12/860,038

(22) Filed: Aug. 20, 2010

(65) Prior Publication Data

US 2010/0309827 A1 Dec. 9, 2010

Related U.S. Application Data

(63) Continuation of application No. PCT/KR2008/007075, filed on Dec. 1, 2008.

(30) Foreign Application Priority Data

Feb. 20, 2008 (KR) .................. 10-2008-0015444

(51) Int. Cl.
*H04J 3/00* (2006.01)
*H04B 1/56* (2006.01)
*H04B 1/403* (2015.01)

(52) U.S. Cl.
CPC . *H04B 1/56* (2013.01); *H04B 1/403* (2013.01)

(58) Field of Classification Search
CPC .............. H04J 3/02; H04L 5/14; H04B 1/403
USPC ......................................... 370/276, 277, 280
See application file for complete search history.

(56) References Cited

U.S. PATENT DOCUMENTS

| 5,590,412 | A | | 12/1996 | Sawai et al. |
|---|---|---|---|---|
| 5,787,117 | A | | 7/1998 | Ash |
| 5,844,299 | A | * | 12/1998 | Merrill et al. .................. 257/531 |
| 6,088,337 | A | * | 7/2000 | Eastmond et al. ............. 370/280 |
| 6,728,517 | B2 | | 4/2004 | Sugar et al. |
| 6,735,418 | B1 | * | 5/2004 | MacNally et al. ............... 455/78 |
| 7,039,381 | B2 | * | 5/2006 | Yang et al. ...................... 455/292 |
| 7,065,327 | B1 | * | 6/2006 | Macnally et al. ............... 455/78 |
| 7,526,018 | B2 | * | 4/2009 | Seo et al. ....................... 375/219 |
| 7,676,244 | B2 | * | 3/2010 | Park et al. .................. 455/552.1 |
| 7,715,792 | B2 | * | 5/2010 | Linde ........................... 455/41.2 |
| 7,982,533 | B2 | * | 7/2011 | Fan et al. ....................... 327/553 |
| 7,995,970 | B2 | * | 8/2011 | Hung et al. ..................... 455/73 |

(Continued)

FOREIGN PATENT DOCUMENTS

| JP | 2002-330085 A | 11/2002 |
|---|---|---|
| JP | 2002-335169 A | 11/2002 |
| KR | 10-2005-0009002 A | 1/2005 |

OTHER PUBLICATIONS

International Search Report for PCT/KR2008/007075 issued Jun. 15, 2009 [PCT/ISA/210].

(Continued)

*Primary Examiner* — Chi H Pham
*Assistant Examiner* — Robert Lopata
(74) *Attorney, Agent, or Firm* — Sughrue Mion, PLLC

(57) ABSTRACT

Provided is a time division duplex (TDD) transceiver. A receiver chain processing received signals and a transmitter chain processing signals to be transmitted share an electronic component used in a circuit, such as an amplifier, a mixer, a filter, etc., so that the size of a semiconductor die needed to manufacture a radio frequency (RF) chip can be reduced.

23 Claims, 7 Drawing Sheets

(56) References Cited

U.S. PATENT DOCUMENTS

| | | | |
|---|---|---|---|
| 8,107,906 B2* | 1/2012 | Lum et al. | 455/137 |
| 8,204,451 B1* | 6/2012 | Kheirkhahi et al. | 455/84 |
| 8,233,524 B2* | 7/2012 | Thirumoorthy | 375/235 |
| 2005/0136846 A1* | 6/2005 | Kim et al. | 455/78 |
| 2006/0035601 A1* | 2/2006 | Seo | 455/78 |
| 2006/0063494 A1 | 3/2006 | Zhang et al. | |
| 2008/0119145 A1* | 5/2008 | Lee et al. | 455/101 |
| 2008/0207256 A1* | 8/2008 | Chan | 455/550.1 |
| 2008/0219229 A1* | 9/2008 | Zheng | 370/338 |
| 2009/0088110 A1* | 4/2009 | Schuur et al. | 455/209 |
| 2010/0048146 A1* | 2/2010 | McCallister | 455/78 |
| 2010/0260078 A1* | 10/2010 | Kim et al. | 370/280 |

OTHER PUBLICATIONS

Written Opinion for PCT/KR2008/007075 issued Jun. 15, 2009 [PCT/ISA/237].

Communication, dated Mar. 21, 2014, issued by the Korean Intellectual Property Office in counterpart Korean Application No. 10-2008-0015444.

Communication dated Nov. 28, 2014 issued by Korean Intellectual Property Office in counterpart Korean Patent Application No. 10-2008-0015444.

Communication dated Sep. 23, 2014 issued by Korean Intellectual Property Office in counterpart Korean Patent Application No. 10-2008-0015444.

* cited by examiner

METHOD AND APPARATUS FOR PROCESSING SIGNALS AT TIME DIVISION DUPLEX TRANSCEIVER

CROSS REFERENCE TO RELATED APPLICATIONS

This application is a Continuation Application of International Application PCT/KR2008/007075 filed on Dec. 1, 2008, which claims priority from Korean Patent Application No. 10-2008-0015444, filed on Feb. 20, 2008, the disclosures of which are incorporated herein in its entirety by reference.

BACKGROUND

1. Field

The exemplary embodiments relate to wireless communications, and more particularly, to a method for effectively designing circuits which form a time division duplex (TDD) transceiver.

2. Description of the Related Art

FIG. 1 illustrates a conventional direct conversion type transceiver device. In general, such a transceiver device comprises a radio frequency (RF) chip 100, which processes RF signals, and a digital baseband chip 190, which processes digital signals in a baseband.

The RF chip 100 comprises a receiver chain 150, which processes received signals, and a transmitter chain 160, which processes signals to be transmitted.

Firstly, in signal processing of the receiver chain 150, a low noise amplifier 151 amplifies the RF signals received through an antenna and minimizes noise in the RF signals.

The amplified signals are frequency down converted into signals in a baseband by a mixer 152 using signals outputted from a phase locked loop (PLL) 170.

The signals in a baseband outputted from the mixer 152 are amplified by a baseband analog (BBA) amplifier 154 via a BBA filter. In general, variable gain amplifiers (VGA) are used as the BBA amplifiers 154 and 162.

Signals processed by the receiver chain 150 in this way are transferred to the digital baseband chip 190. The transferred signals are converted into digital signals by an analog/digital (A/D) converter 110 and are demodulated by a modem 130.

Meanwhile, a procedure for transmitting signals is performed in a reverse order. In other words, bit streams in a baseband are modulated by the modem 130 using phase shift keying (PSK) or quadrature amplitude modulation (QAM) and are then converted into analog signals by a digital/analog (D/A) converter 120.

The converted signals are frequency up converted by a mixer 163 via the BBA filter 161 and the BBA amplifier 162. The signals output from the mixer 163 are amplified by power amplifiers (PA) 164 and then are transmitted through an antenna.

In this way, in a conventional transceiver, the receiver chain 150 and the transmitter chain 160 are integrated on one chip. Unlike in the case of a digital IC, since an RF chip is not easily scaled down despite the development of a semiconductor manufacturing process, a circuit needs to be designed so as to minimize the size of a semiconductor die.

In particular, as a multi-input multi-output (MIMO) technology for transmitting and receiving data using a plurality of antennas has been recently developed, a plurality of receiver chains and transmitter chains are needed in a transceiver having an MIMO function. In this case, the size of a die is very large and thus costs for producing an RF chip increase.

In addition, as chains increase like in an MIMO technology, layout becomes more complicated. As the size of a package increases, a parasitic effect occurs and performance may deteriorate.

SUMMARY

The exemplary embodiments provide a method and apparatus for processing signals at a time division duplex transceiver by reducing the size of an RF chip in a time division duplex (TDD) transceiver device.

According to an aspect of an exemplary embodiment, there is provided a method for processing signals by using a time division duplex (TDD) transceiver device, wherein a transmitter chain processing signals to be transmitted and a receiver chain processing received signals share at least one electronic component.

A power amplifier (PA) of the transmitter chain and a low noise amplifier (LNA) of the receiver chain may share at least one inductor.

An up mixer of the transmitter chain and a down mixer of the receiver chain may share at least one inductor.

The transmitter chain and the receiver chain may share at least one of a filter and an amplifier of a baseband stage.

The transmitter chain and the receiver chain may share at least one of a filter and an amplifier of an intermediate frequency stage.

The transceiver device may be a multi-input multi-output (MIMO) system comprising a plurality of transmitter chains and a plurality of receiver chains.

The transceiver device may include a digital baseband chip and a radio frequency (RF) chip, the method including: converting parallel digital signals for controlling a gain of a variable gain amplifier of the RF chip into serial digital signals by using the digital baseband chip; transmitting through a single pin the converted serial digital signals from the digital baseband chip to the RF chip; converting the serial digital signals into parallel digital signals by using the RF chip; and controlling the gain of the variable gain amplifier based on the converted parallel digital signals by using the RF chip.

The transceiver device may include a digital baseband chip and a radio frequency (RF) chip, the method including: converting digital signals for controlling a gain of a variable gain amplifier of the RF chip into analog signals by using the digital baseband chip; transmitting the converted analog signals from the digital baseband chip to the RF chip; converting the received analog signals into digital signals by using the RF chip; and controlling the gain of the variable gain amplifier based on the converted digital signals by using the RF chip.

The transceiver device may include a digital baseband chip and a radio frequency (RF) chip, the method including: converting digital signals for controlling a gain of a variable gain amplifier of the RF chip into analog signals by using the digital baseband chip; transmitting the converted analog signals from the digital baseband chip to the RF chip; and controlling the gain of the variable gain amplifier based on the converted digital signals by using the RF chip.

The exemplary embodiments also provide a computer readable medium in which a program for executing the method for processing signals is recorded.

A TDD transceiver device, wherein a transmitter chain processing signals to be transmitted and a receiver chain processing received signals may share at least one electronic component.

In one exemplary embodiment, there is a transceiver device including: a downstream path; an upstream path; and an electronic component comprising one of a signal processor and a signal conditioning unit, the electronic component disposed in the downstream path of a received signal and disposed in the upstream path of a signal to be transmitted.

In an exemplary embodiment, the electronic component is the signal conditioning unit comprising an inductor.

In another exemplary embodiment, there further is a power amplifier in the upstream path; and a low noise amplifier in the downstream path, wherein the inductor is disposed in the power amplifier and the low noise amplifier.

In yet another exemplary embodiment, there further is an up mixer in the upstream path; and a down mixer in the downstream path, wherein the inductor is disposed in the up mixer and the down mixer.

In an exemplary embodiment, the electronic component is the signal processor comprising one of a filter and an amplifier.

In another exemplary embodiment, the one of the filter and the amplifier is disposed in a baseband stage of the upstream path and the downstream path or disposed in an intermediate stage of the upstream path and the downstream path.

According to the exemplary embodiments, since the area size of a semiconductor die needed to manufacture an RF chip in a transceiver that operates in a TDD manner is reduced, costs for producing a transceiver can be greatly reduced.

In addition, the complexity of layout is reduced and the number of pins and the size of a package are reduced so that an effect (a parasitic effect) due to parasitic components can be reduced.

DETAILED DESCRIPTION OF EXEMPLARY EMBODIMENTS

The exemplary embodiments will now be described more fully with reference to the accompanying drawings. Hereinafter, for convenience of explanation, a direct conversion type single input single output (SISO) transceiver is described. However, it would be obvious to one of ordinary skill in the art that the exemplary embodiments can be applied to an MIMO transceiver or a transceiver comprising a filter and an amplifier at an intermediate frequency stage. Expressions such as "at least one of," when preceding a list of elements, modify the entire list of elements and do not modify the individual elements of the list.

Figure 2:
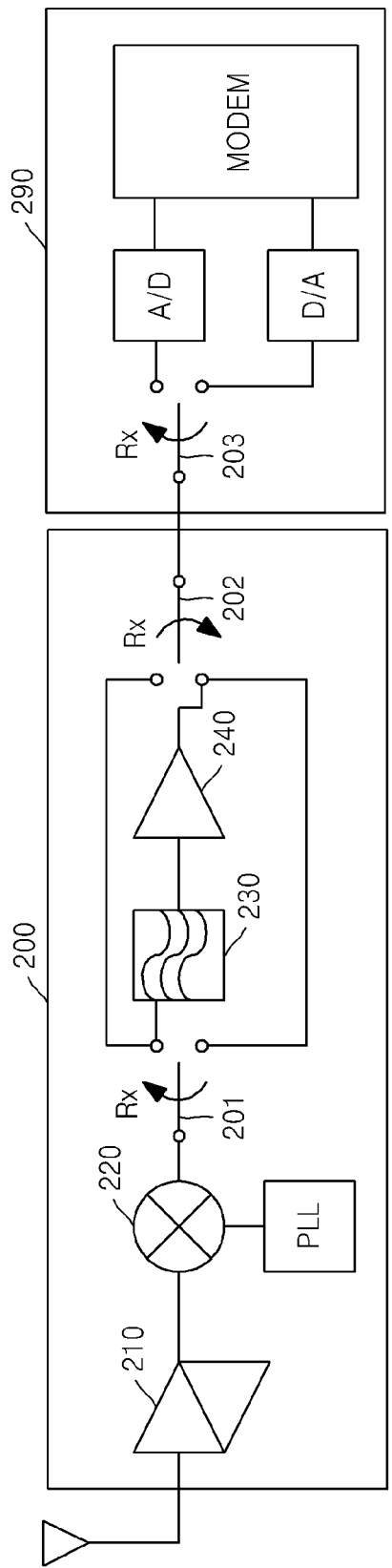
FIG. 2 schematically illustrates a structure of a transceiver device according to an exemplary embodiment.

FIG. 2 schematically illustrates a structure of a transceiver device 200 according to an exemplary embodiment. As illustrated in FIG. 2, in the transceiver device 200 according to an exemplary embodiment, a receiver chain and a transmitter chain share at least one electronic component so that two different circuits are implemented as one circuit. For example, in the transceiver device 200 according to an exemplary embodiment, one amplifier circuit 210 is used as a low-power amplifier circuit of the receiver chain and a power amplifier circuit of the transmitter chain.

To this end, in the transceiver device 200 according to the exemplary embodiment, the receiver chain and the transmitter chain share at least one electronic component. Here, the electronic component is an element used in an electronic circuit, for example, a passive element, such as a resistor, a capacitor, an inductor, etc., or an active element such as a transistor. The electronic elements must be used in a time division manner so that a receiver chain and a transmitter chain share the electronic elements. Thus, the exemplary embodiment may be applied to a time division duplex (TDD) receiver.

The receiver chain and the transmitter chain share an RF amplifier 210, a mixer 220, a BBA filter 230, and a BBA amplifier 240. For reference, reference numeral 210 denotes an RF amplifier, and when signals are received, the direction of the signals are in a right direction with respect to the drawings, and when signals are transmitted, the direction of the signals are in a left direction.

In other words, the RF amplifier 210 operates as a low noise amplifier when receiving signals and operates as a power amplifier when transmitting signals.

The mixer 220 performs frequency down conversion when receiving signals and performs frequency up conversion when transmitting signals. In other words, the mixer 220 operates as a down mixer at the receiver chain and operates as an up mixer at the transmitter chain.

Figure 1:
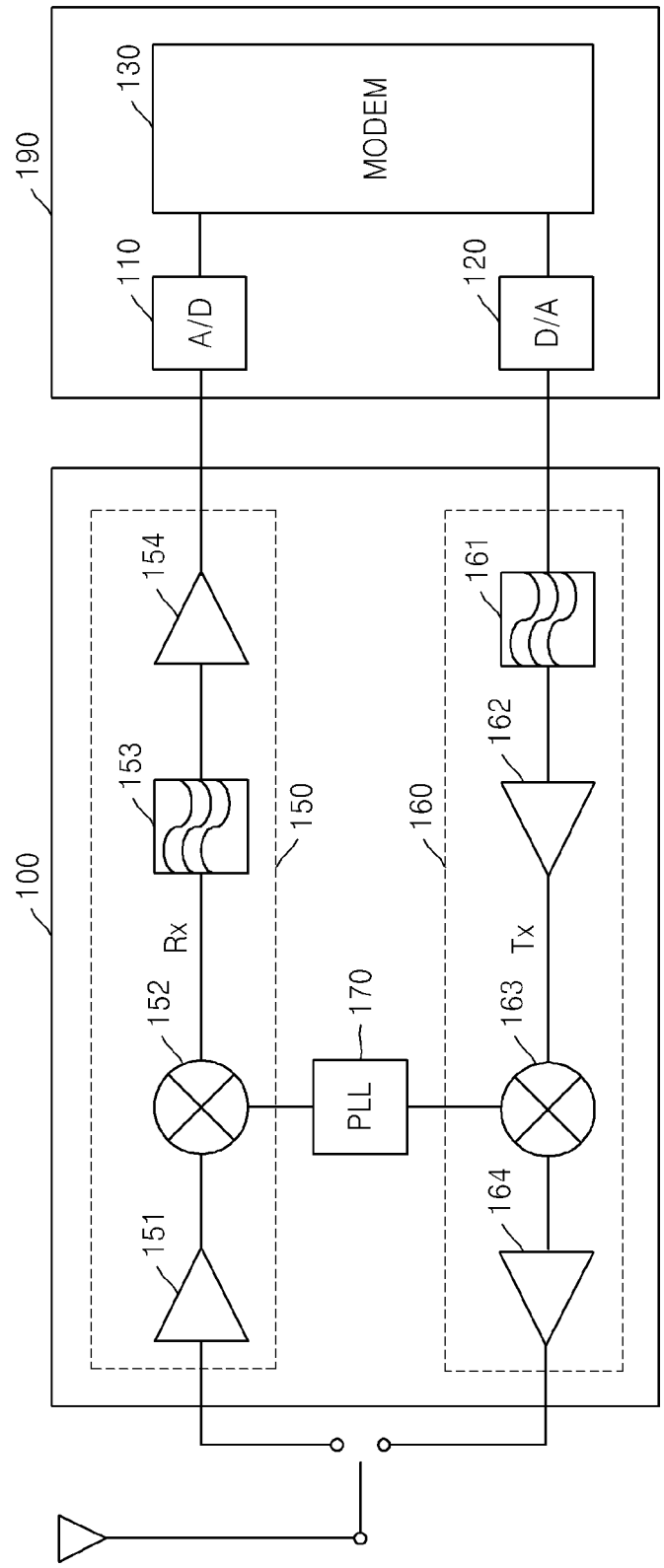
FIG. 1 illustrates a conventional direct conversion type time division duplex (TDD) transceiver device.

The BBA filter 230 and the BBA amplifier 240 respectively perform low pass filtering and amplification of baseband signals. The direction of signals is controlled by switches 201, 202, and 203. The operation of the digital baseband chip 290 is the same as the digital baseband chip 190 in FIG. 1 except for a switch 203 for controlling the direction of signals.

In this way, in the transceiver according to the exemplary embodiment, a circuit, such as an amplifier, a mixer, a filter, etc., is shared by the receiver chain and the transmitter chain so that the area size of the RF chip 200 can be reduced.

As described above, here, the direct conversion type transceiver has been illustrated. However, one of an amplifier, a mixer, a filter, etc., is shared by the receiver chain and the transmitter chain even in a transceiver having an intermediate frequency stage so that the same effect can be predicted.

Figure 3A:
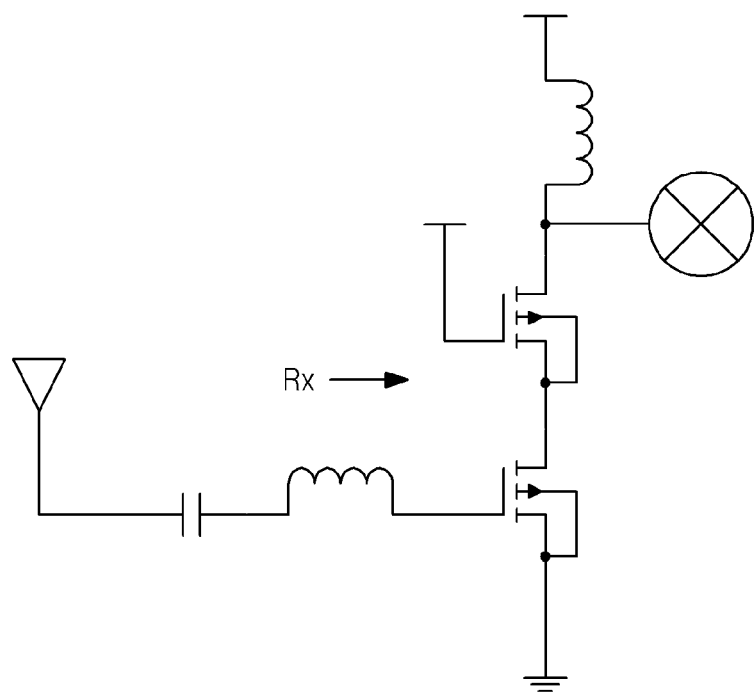
FIGS. 3A through 3C illustrate a structure of a radio frequency (RF) amplifier circuit according to an exemplary embodiment.
Figure 3B:
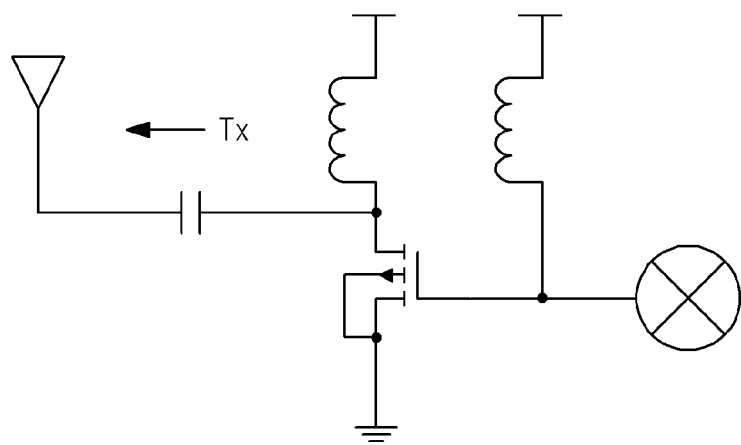
Figure 3C:
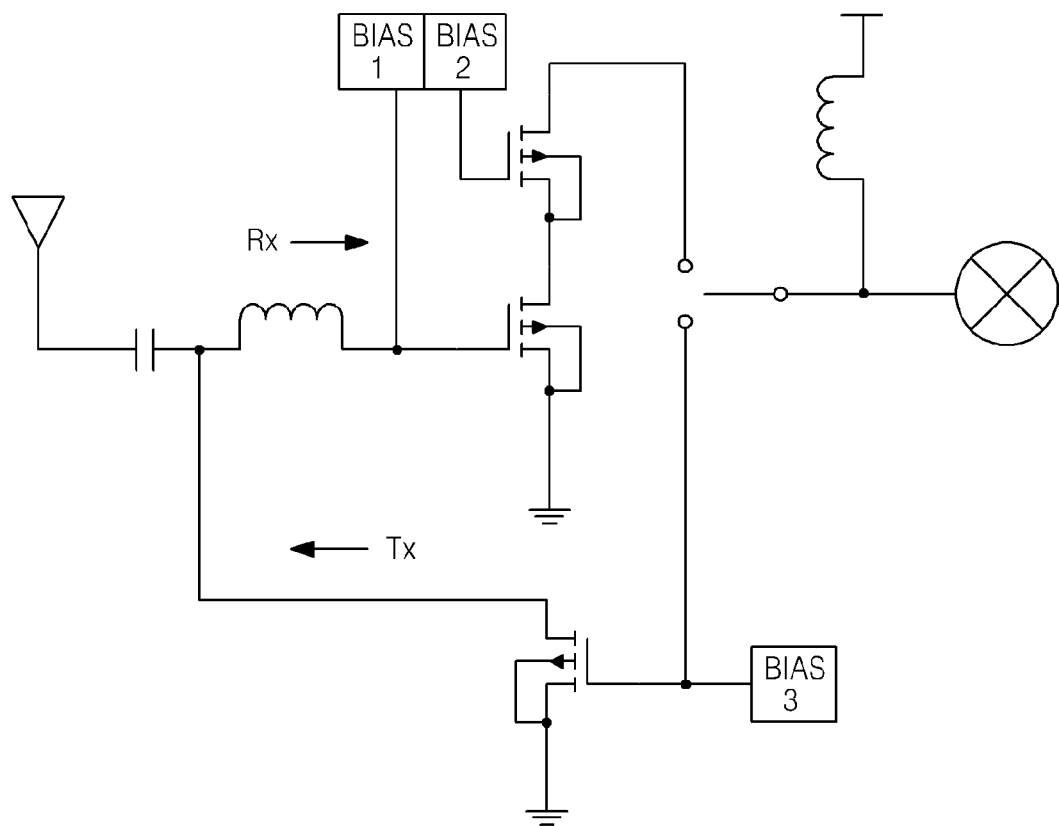

FIGS. 3A through 3C illustrate a structure of a radio frequency (RF) amplifier circuit according to an exemplary embodiment. FIG. 3A illustrates a conventional low noise amplifier (LNA) and FIG. 3B illustrates a general power amplifier (PA) circuit. Two circuits illustrated in FIGS. 3A and 3B may be integrated into a single circuit, as illustrated in FIG. 3C.

In other words, when processing received signals, a lower transistor is cut off and operates as a low noise amplifier, and when they process signals to be transmitted, two upper transistors are cut off and operate as PA amplifiers. In other words, when the circuits of FIG. 3C transmit and receive signals, a path, through which signals flow, is switched. Such a switching operation may be performed by simultaneously adjusting transistor biases 1, 2, and 3. In addition, switching may also be performed by adjusting the size of a transistor. By switching, the receiver chain and the transmitter chain according to an exemplary embodiment may share an RF amplifier.

As illustrated in FIGS. 3A and 3B, a total of four inductors are used in a circuit that forms a low noise amplifier and a PA amplifier of a general RF chip. However, as illustrated in FIG. 3C, the low noise amplifier and the PA amplifier of an RF chip according to an exemplary embodiment may be implemented using only two inductors.

The circuits illustrated in FIGS. 3A through 3C are examples of RF amplifiers. It would be obvious to one of ordinary skill in the art that an RF amplifier could be implemented in various different ways.

Figure 4A:
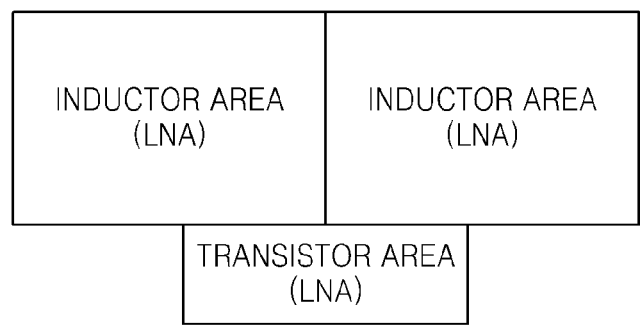
FIGS. 4A and 4B illustrate the size efficiency of a semiconductor die in a case where an RF amplifier circuit is designed according to an exemplary embodiment.
Figure 4A:
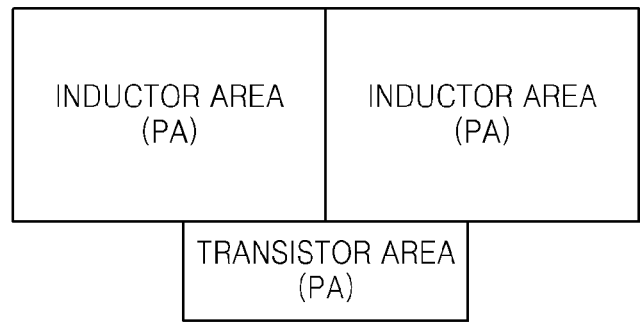
Figure 4B:
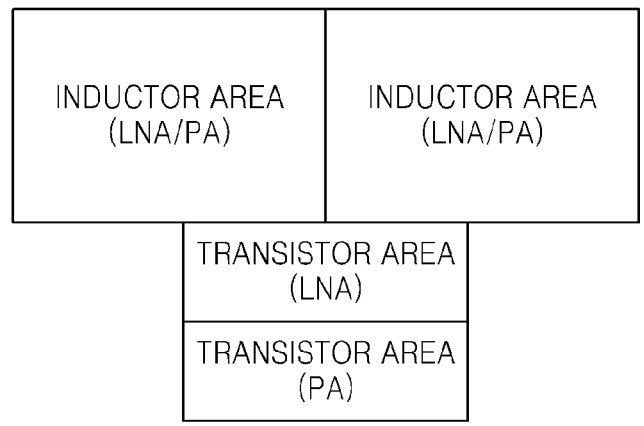

FIGS. 4A and 4B illustrate the area size efficiency of a semiconductor die in case where an RF amplifier circuit is designed according to and exemplary embodiment.

FIG. 4A schematically illustrates the size of a semiconductor die in a case where the low noise amplifier circuit of FIG. 3A and the PA amplifier of FIG. 3B are manufactured according to an actual semiconductor manufacturing process, and FIG. 4B schematically illustrates the size of a semiconductor die in the case where the integrated amplifier circuit of FIG. 3C is manufactured.

As known from FIGS. 4A and 4B, the size of a passive element, such as an inductor etc., is much larger than the size of an active element, such as a transistor. Thus, as in the exemplary embodiment, the area size of a semiconductor die can be greatly reduced by reducing the number of inductors. For reference purposes, the ratio of the size of an inductor to the size of a transistor is much larger than that of FIGS. 4A and 4B.

Figure 5:
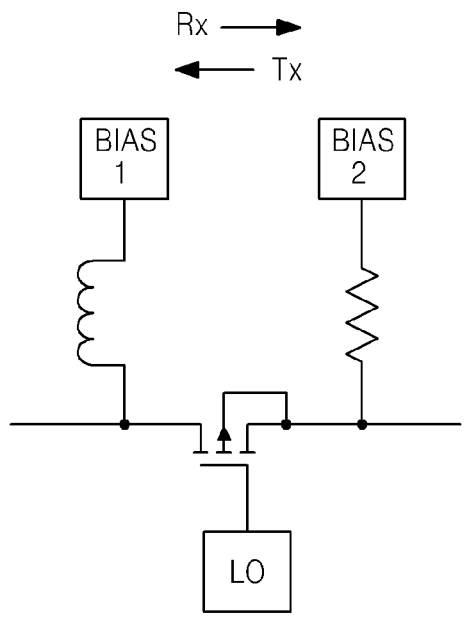
FIG. 5 illustrates a mixer circuit according to an exemplary embodiment.

FIG. 5 illustrates a mixer circuit according to an exemplary embodiment. As illustrated in FIG. 5, in an RF chip according to an exemplary embodiment, the receiver chain and the transmitter chain use the same circuit so as to perform frequency mixing. Switching of the direction of signals according to reception and transmission of signals is performed by adjusting the bias of a transistor and the size of the transistor. In this way, a mixer needed in the transmitter chain and the receiver chain is implemented as one circuit so that a reduction in the are a size of the semiconductor die can be predicted.

Figure 6A:
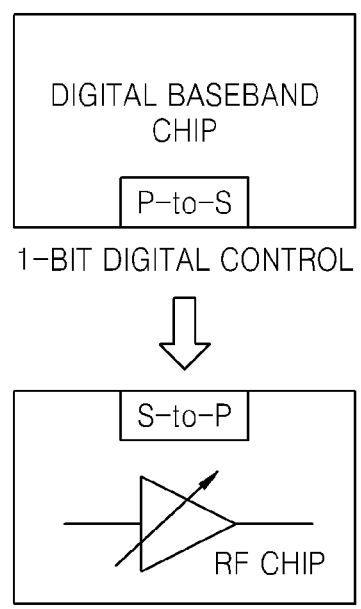
FIGS. 6A through 6C illustrate an RF integrated circuit (IC) having a minimized number of pins, according to exemplary embodiments.
Figure 6B:
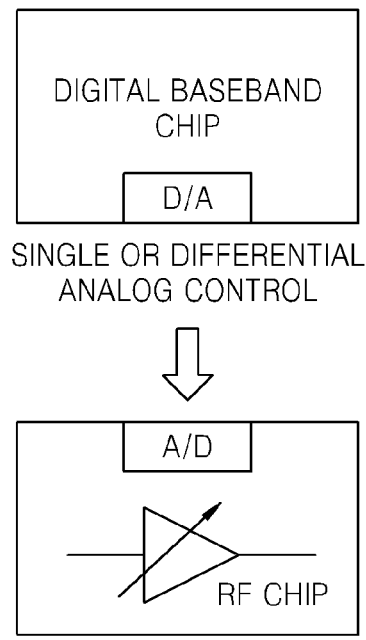
Figure 6C:
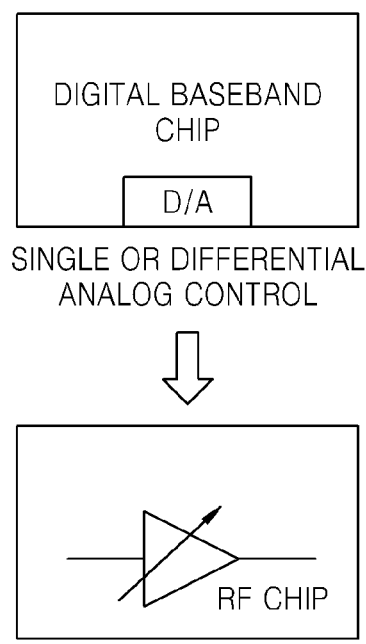

FIGS. 6A through 6C illustrate an RF integrated circuit (IC) having a minimized number of pins, according to exemplary embodiments.

As described above, as the number of pins increases, the size of a package increases. Thus, a parasitic effect occurs due to parasitic components. When a digital baseband chip and an RF chip are not implemented as a single chip, the RF chip must include a plurality of pins to which gain control signals of a BBA amplifier are input. For example, in order to control a variable gain amplifier of maximum gain 90 db in units of 1 db, at least seven pins (2^7=128) must be included in the RF chip. Hereinafter, methods for reducing the number of pins to which gain control signals of the BBA amplifier are input in the RF chip will be described with reference to FIGS. 6A through 6C.

In the method of FIG. 6A, digital gain control signals are converted into high-speed serial signals from parallel signals at a digital baseband chip and then are transmitted to the RF chip, and the RF chip converts the received serial signals into parallel signals to control the gain of the BBA amplifier. According to the method, the RF chip needs only one pin in order to receive the digital gain control signals.

In the method of FIG. 6B, digital gain control signals are converted into analog signals and are transmitted to the RF chip, and the RF chip converts the received analog signals back into digital signals so as to control the gain of the BBA amplifier. According to the method, the RF chip needs only one or two pins (in the case where the received analog signals are converted into differential signals) in order to receive the digital gain control signals.

In the method of FIG. 6C, the operation of the digital baseband chip is the same as that of FIG. 6B but the RF chip controls the gain of the BBA amplifier by using the received analog signals. However, the BBA amplifier used in the RF chip must be a variable gain amplifier that can operate with analog control signals.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the exemplary embodiments, since the size of a semiconductor die needed to manufacture an RF chip in a transceiver that operates in a TDD manner is reduced, costs for producing a transceiver can be greatly reduced.

In addition, the complexity of layout is reduced and the number of pins and the size of a package are reduced so that an effect (a parasitic effect) due to parasitic components can be reduced.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for processing signals using a time division duplex (TDD) transceiver device, the method comprising:
    using a transmitter chain to process signals to be transmitted; and
    using a receiver chain to process received signals,
    wherein the transmitter chain and the receiver chain share at least one electronic component and the at least one electronic component performs a first function in the transmitter chain and performs a second function different from the first function in the receiver chain,
    wherein the transceiver device includes a digital baseband chip and a radio frequency (RF) chip, the method further comprising:
    converting first parallel digital signals for controlling a gain of a variable gain amplifier of the RF chip into serial digital signals using the digital baseband chip; and
    transmitting the serial digital signals from the digital baseband chip to the RF chip.

2. The method of claim 1, wherein the transmitter chain and the receiver chain share at least one of a filter and an amplifier of a baseband stage.

3. The method of claim 1, wherein the transmitter chain and the receiver chain share at least one of a filter and an amplifier of an intermediate frequency stage.

4. The method of claim 1, wherein the transceiver device is an multi-input multi-output (MIMO) system comprising a plurality of transmitter chains and a plurality of receiver chains.

5. The method of claim 1, the method further comprising:
converting the serial digital signals into second parallel digital signals using the RF chip; and
controlling the gain of the variable gain amplifier based on the second parallel digital signals using the RF chip.

6. The method of claim 1, wherein the transceiver device includes a digital baseband chip and an RF chip, the method further comprising:
converting first digital signals for controlling a gain of a variable gain amplifier of the RF chip into analog signals using the digital baseband chip;
transmitting the analog signals from the digital baseband chip to the RF chip;
converting the received analog signals into second digital signals using the RF chip; and
controlling the gain of the variable gain amplifier based on the second digital signals using the RF chip.

7. The method of claim 1, wherein the transceiver device includes a digital baseband chip and an RF chip, the method further comprising:
converting digital signals for controlling a gain of a variable gain amplifier of the RF chip into analog signals using the digital baseband chip;
transmitting the analog signals from the digital baseband chip to the RF chip; and
controlling the gain of the variable gain amplifier based on the digital signals using the RF chip.

8. A time division duplex (TDD) transceiver device comprising:
a transmitter chain processing signals to be transmitted; and
a receiver chain processing received signals,
wherein the transmitter chain and the receiver chain share at least one electronic component and the at least one electronic component performs a first function in the transmitter chain and performs a second function different from the first function in the receiver chain,
wherein the transceiver device further comprises:
a digital baseband chip; and
a radio frequency (RF) chip,
wherein the digital baseband chip converts first parallel digital signals for controlling a gain of a variable gain amplifier of the RF chip into serial digital signals and transmits the converted serial digital signals to the RF chip.

9. The device of claim 8, wherein the transmitter chain and the receiver chain share at least one of a filter and an amplifier of a baseband stage.

10. The device of claim 8, wherein the transmitter chain and the receiver chain share at least one of a filter and an amplifier of an intermediate frequency stage.

11. The device of claim 8, wherein the transceiver device is a multi-input multi-output (MIMO) system comprising a plurality of transmitter chains and a plurality of receiver chains.

12. The device of claim 8,
wherein the RF chip converts the serial digital signals into second parallel digital signals and controls the gain of the variable gain amplifier based on the second parallel digital signals.

13. The device of claim 8, wherein the transceiver device further comprises:
a digital baseband chip; and
an RF chip,
wherein the digital baseband chip converts first digital signals for controlling a gain of a variable gain amplifier of the RF chip into analog signals and transmits the analog signals to the RF chip, and the RF chip converts the received analog signals into second digital signals and controls the gain of the variable gain amplifier based on the second digital signals.

14. The device of claim 8, wherein the transceiver device further comprises:
a digital baseband chip; and
an RF chip,
wherein the digital baseband chip converts digital signals for controlling a gain of a variable gain amplifier of the RF chip into analog signals and transmits the analog signals to the RF chip, and the RF chip controls the gain of the variable gain amplifier based on the received analog signals.

15. A non-transitory computer readable medium in which a program for executing the method of claim 1 is recorded.

16. A transceiver device comprising:
a downstream path;
an upstream path;
an electronic component comprising one of a signal processor and a signal conditioning unit, the electronic component disposed in the downstream path of a received signal in a receiver chain and disposed in the upstream path of a signal to be transmitted in a transmitter chain;
a power amplifier in the upstream path; and
a low noise amplifier in the downstream path,
wherein an inductor is disposed in the power amplifier and the low noise amplifier, and wherein the transceiver device further comprises:
a digital baseband chip; and
a radio frequency (RF) chip,
wherein the digital baseband chip converts first parallel digital signals for controlling a gain of a variable gain amplifier of the RF chip into serial digital signals and transmits the converted serial digital signals to the RF chip.

17. The transceiver of claim 16, wherein the electronic component is the signal conditioning unit comprising an inductor.

18. The transceiver of claim 17 further comprising:
an up mixer in the upstream path; and
a down mixer in the downstream path,
wherein the inductor is disposed in the up mixer and the down mixer.

19. The transceiver of claim 16, wherein the electronic component is the signal processor comprising one of a filter and an amplifier.

20. The transceiver of claim 19, wherein the one of the filter and the amplifier is disposed in a baseband stage of the upstream path and the downstream path or disposed in an intermediate stage of the upstream path and the downstream path.

21. The method of claim 1, wherein a power amplifier (PA) of the transmitter chain includes at least one inductor and a low noise amplifier of the receiver chain includes the same inductor.

22. The method of claim 1, wherein a power amplifier (PA) of the transmitter chain and an low noise amplifier (LNA) of the receiver chain share at least one inductor.

23. The device of claim 10, wherein a power amplifier (PA) of the transmitter chain and a low noise amplifier (LNA) of the receiver chain share at least one inductor.

* * * * *